US011580985B2

(12) United States Patent
Spry et al.

(10) Patent No.: US 11,580,985 B2
(45) Date of Patent: Feb. 14, 2023

(54) TRANSCRIPTION OF COMMUNICATIONS

(71) Applicant: Sorenson IP Holdings, LLC, Salt Lake City, UT (US)

(72) Inventors: Andrew Jesse Spry, South Jordan, UT (US); David Earl Bergum, Saratoga Springs, UT (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 169 days.

(21) Appl. No.: 16/906,036

(22) Filed: Jun. 19, 2020

(65) Prior Publication Data

US 2021/0398537 A1 Dec. 23, 2021

(51) Int. Cl.
*G10L 15/26* (2006.01)
*G10L 15/30* (2013.01)
*G10L 15/32* (2013.01)

(52) U.S. Cl.
CPC .............. *G10L 15/26* (2013.01); *G10L 15/30* (2013.01); *G10L 15/32* (2013.01)

(58) Field of Classification Search
CPC .......... G10L 15/26; G10L 15/30; G10L 15/32
See application file for complete search history.

(56) References Cited

U.S. PATENT DOCUMENTS 9,497,315 B1 * 11/2016 Pakidko .............. H04M 3/2281
10,455,076 B1 10/2019 Kapadia et al.
2015/0002611 A1 * 1/2015 Thapliyal ............ H04L 12/1827
704/270.1
2015/0094105 A1 4/2015 Pan
2015/0245186 A1 8/2015 Park et al.
2016/0021145 A1 1/2016 Khalil et al.
2016/0323445 A1 11/2016 Warren et al.
2017/0178630 A1 6/2017 Gummadi et al.
2018/0255163 A1 9/2018 Stimpson et al.
2020/0007671 A1 * 1/2020 Engelke .............. H04M 1/2475

FOREIGN PATENT DOCUMENTS

KR 20160142079 A 12/2016

* cited by examiner

*Primary Examiner* — Bhavesh M Mehta
*Assistant Examiner* — Darioush Agahi
(74) *Attorney, Agent, or Firm* — Maschoff Brennan

(57) ABSTRACT

A method to transcribe communications may include obtaining, at a first device, an audio signal that originates at a remote device during a communication session. The audio signal may be shared between the first device and a second device. The method may also include obtaining an indication that the second device is associated with a remote transcription system and in response to the second device being associated with the remote transcription system, directing the audio signal to the remote transcription system by one of the first device and the second device instead of both the first device and the second device directing the audio signal to the remote transcription system when the second device is not associated with the remote transcription system.

20 Claims, 6 Drawing Sheets

TRANSCRIPTION OF COMMUNICATIONS

FIELD

The embodiments discussed in the present disclosure are related to transcription of communications.

BACKGROUND

Transcriptions of audio communications between people may assist people that are hard-of-hearing or deaf to participate in the audio communications. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one or more aspects of the present disclosure, a method to transcribe communications may include obtaining, at a first device, an audio signal that originates at a remote device during a communication session. The audio signal may be shared between the first device and a second device. The method may also include obtaining an indication that the second device is associated with a remote transcription system and in response to the second device being associated with the remote transcription system, directing the audio signal to the remote transcription system by one of the first device and the second device instead of both the first device and the second device directing the audio signal to the remote transcription system when the second device is not associated with the remote transcription system.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments in this disclosure relate to systems and methods that may be configured to transcribe audio of a communication session. For example, in some embodiments, audio of a communication session may be provided to a transcription system to transcribe the audio from a device that receives and/or generates the audio. A transcription of the audio generated by the transcription system may be provided back to the device for display to a user of the device. The transcription may assist the user to better understand what is being said during the communication session.

In some circumstances, audio of a communication session from a remote device may be shared between multiple devices of a single user. For example, a communication session may be established at a first device, such as a mobile phone. The first device may direct the audio of the communication session from the remote device over a wireless connection to a second device. The second device may broadcast the audio and capture audio for sending during the communication session to the remote device.

In some circumstances, one of the first device and the second device may be associated with a transcription system. In these situations, the one of the first device and the second device may send the audio from the remote device to the transcription system to obtain transcriptions during the communication session.

In some circumstance, both the first device and the second device may be associated with the transcription system. In these situations, one of the first device and the second device may send the audio from the remote device to the transcription to obtain transcriptions during the communication session. Some embodiments in this disclosure relate to systems and methods that may allow the first device and the second device to determine that the first device and the second device are both associated with the transcription system and select one of the first device and the second device to send the audio from the remote device to the transcription system instead of both the first device and the second device sending the audio from the remote device to the transcription system.

Figure 1:
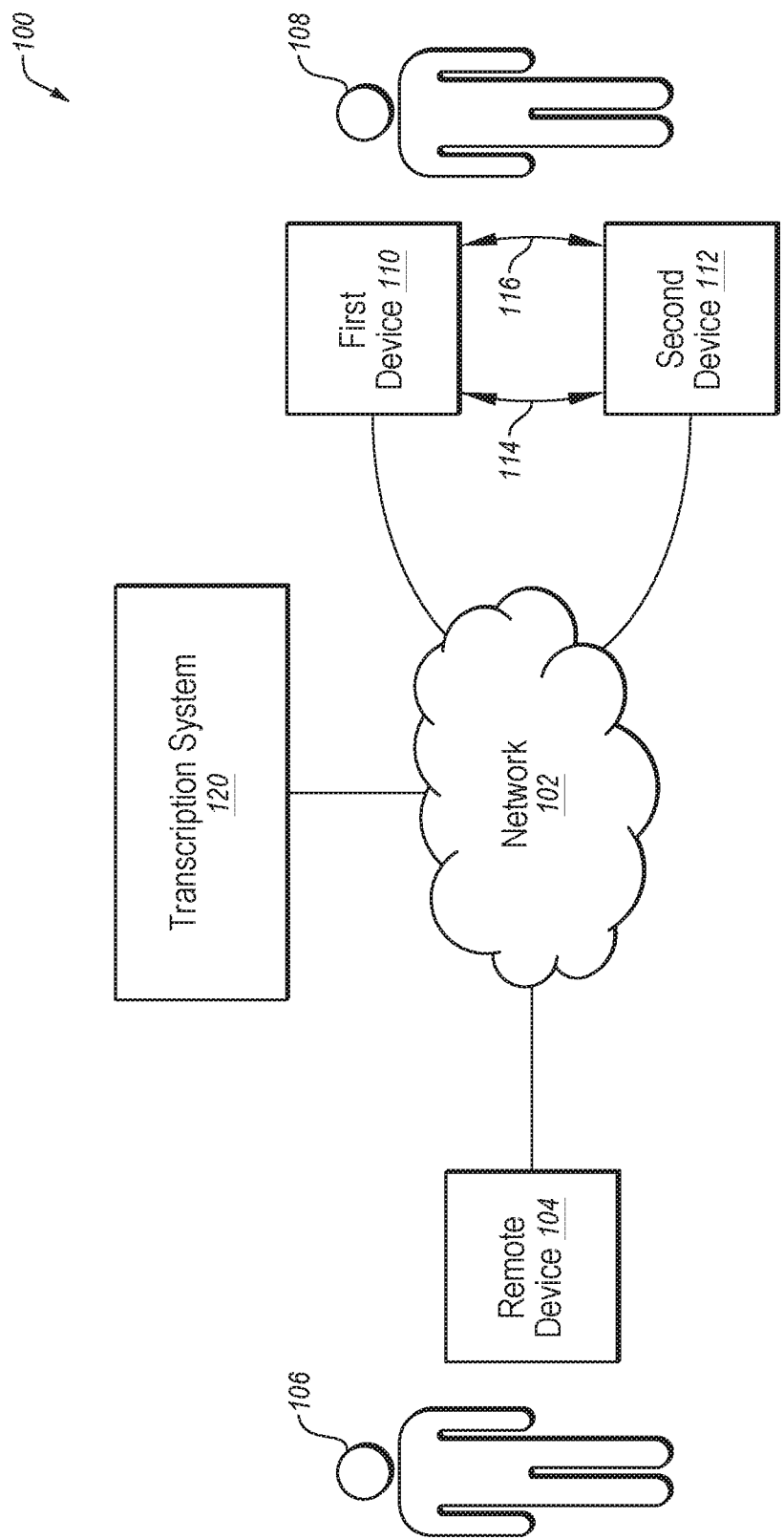
FIG. 1 illustrates an example environment for transcription of communications.

Turning to the figures, FIG. 1 illustrates an example environment 100 for transcription of communications. The environment 100 may be arranged in accordance with at least one embodiment described in the present disclosure. The environment 100 may include a first network 102, a remote device 104, a first device 110, a second device 112, a second network 114, a third network 116, and a transcription system 120.

The first network 102 may be configured to communicatively couple the remote device 104, the first device 110, the second device 112, and the transcription system 120. In some embodiments, the first network 102 may be any network or configuration of networks configured to send and receive communications between systems and devices. In some embodiments, the first network 102 may include a wired network, an optical network, and/or a wireless network, and may have numerous different configurations, including multiple different types of networks, network connections, and protocols to communicatively couple devices and systems in the environment 100. In some embodiments, the first network 102 may also be coupled to or may include portions of a telecommunications network, including telephone lines, for sending data in a variety of different communication protocols, such as a plain old telephone system (POTS).

Each of the remote device 104, the first device 110, and the second device 112 may be any electronic or digital computing device. For example, each of the remote device 104, the first device 110, and the second device 112 may include a desktop computer, a laptop computer, a smartphone, a mobile phone, a tablet computer, a telephone, a phone console, a caption device, a captioning telephone, or any other computing device that may be used for communication between a second user 106 of the remote device 104 and a first user 108 of the first device 110 and the second device 112.

In some embodiments, each of the remote device 104, the first device 110, and the second device 112 may include memory and at least one processor, which are configured to perform operations as described in this disclosure, among other operations. In some embodiments, each of the remote device 104, the first device 110, and the second device 112 may include computer-readable instructions that are configured to be executed by each of the remote device 104, the first device 110, and the second device 112 to perform operations described in this disclosure.

In some embodiments, the remote device 104 and at least one or both of the first device 110 and the second device 112 may be configured to establish communication sessions with other devices. For example, the first device 110 may be configured to establish an outgoing communication session, such as a telephone call, video call, or other communication session, with another device over a telephone line or network. For example, the remote device 104 and at least one of the first device 110 and the second device 112 may communicate with the first network 102 over a wireless cellular network, a wired Ethernet network, a wireless 802.11 network, an optical network, or a POTS line.

In some embodiments, the remote device 104 and at least one or both of the first device 110 and the second device 112 may be configured to obtain audio during a communication session. The audio may be part of a video communication or an audio communication, such as a telephone call. As used in this disclosure, the term audio may be used generically to refer to sounds that may include spoken words. Furthermore, the term "audio" may be used generically to include audio in any format, such as a digital format, an analog format, or a propagating wave format. Also, as used in this disclosure, the term video may be used generically to refer to a compilation of images that may be reproduced in a sequence to produce video.

As an example of obtaining audio, the first device 110 may be configured to obtain first audio from the first user 108. For example, the first device 110 may obtain the first audio from a microphone of the first device 110 or from another device that is communicatively coupled to the first device 110, such as the second device 112 or another device.

The remote device 104 may also be configured to obtain remote audio from a second user 106. In some embodiments, the remote device 104 may obtain the remote audio from a microphone of the remote device 104 or from another device communicatively coupled to the remote device 104. During the communication session, the first device 110 may provide the first audio for the remote device 104. Alternatively or additionally, the remote device 104 may provide the remote audio for the first device 110.

In some embodiments, the transcription system 120 may be associated with one or more of the remote device 104, the first device 110, and/or the second device 112. A device being associated with the transcription system 120 may indicate that the device includes credentials to allow the device to communicate with and receive transcription services from the transcription system 120. For example, a device associated with the transcription system 120 may indicate that the device may send audio to the transcription system 120 and obtain a transcription of the audio from the transcription system 120.

In some embodiments, the transcription system 120 may be configured to generate transcriptions of audio obtained from devices with which the transcription system 120 is associated. The transcription system 120 may be configured to generate the transcriptions of the audio in real-time or substantially real-time during a communication session and send the transcriptions to the associated devices. For example, the first device 110 may send remote audio that originates from the remote device 104 to the transcription system 120 during a communication session with the remote device 104. The transcription system 120 may generate a transcription of the remote audio and provide the transcription to the first device 110. The first device 110 may present the transcription during the communication session in real-time or substantially real-time. In some embodiments, real-time or substantially real-time may indicate that a time difference between when words are audibly broadcast by the first device 110 and corresponding words are presented in the transcription by the first device 110 may be less than five, ten, fifteen, or twenty seconds.

The transcription system 120 may generate transcriptions using a fully machine-based automatic speech recognition (ASR) process that may operate without human intervention. Alternately or additionally, the transcription system 120 may be configured to generate a transcription of audio using a revoicing process. The revoicing process may receive and broadcast audio to a human agent. The human agent may listen to the broadcast and speak the words from the broadcast. The words spoken by the human agent may be captured to generate revoiced audio. The revoiced audio may be used by a speech recognition program to generate the transcription of the audio. Alternately or additionally, the transcription system 120 may use a combination of a machine-based process and a revoicing process to generate a transcription of the audio.

In some embodiments, the first device 110 and the second device 112 may also be configured to be communicatively coupled by the second network 114 and by the third network 116. In these and other embodiments, the second network 114 and the third network 116 may be configured as short-range wireless networks, such as a wireless local area network (WLAN), a personal area network (PAN), or a wireless mesh network (WMN). For example, the second network 114 and/or the third network 116 may include networks that use Bluetooth® Class 2 and Class 3 communications with protocols that are managed by the Bluetooth® Special Interest Group (SIG). Other examples of wireless networks may include the IEEE 802.11 networks (commonly referred to as WiFi®), Zigbee networks, Digital Enhanced Cordless Telecommunications (DECT) networks, Bluetooth® low energy (BLE), among other types of LANS, PANS, and WMNS. Communications may be performed over the second network 114 and the third network 116 using communication protocols that may correspond to the associated short-range wireless networks that may be included in the second network 114 and the third network 116. The second network 114 may be a different type of short-range network than the third network 116.

The first network 102 may generally be configured as a wide area network (WAN) that may extend over a relatively large geographical area as compared to the geographical area that may be covered by a short-range wireless network such as the second network 114 and the third network 116.

In some embodiments, the first device 110 and the second device 112 may both be associated with the first user 108 and may be configured to be communicatively coupled over the second network 114. In these and other embodiments, the first device 110 and the second device 112 may be configured to share audio therebetween over the second network 114 during a communication session between the remote device 104 and one of the first device 110 and the second device 112.

For example, a communication session may be established between the first device 110 and the remote device 104. Before or after the establishment of the communication session, the first device 110 and the second device 112 may be communicatively coupled over the second network 114. Based on the coupling between the first device 110 and the second device 112, when remote audio is obtained by the first device 110 from the remote device 104, the first device 110 may direct the remote audio to the second device 112. The second device 112 may be configured to audibly broadcast the remote audio to the first user 108 during the communication session. In these and other embodiments, the second device 112 may also be configured to capture spoken words of the first user 108 to generate second audio. The second audio may be provided to the first device 110 over the second network 114 and directed by the first device 110 to the remote device 104 during the communication session. In this example, the second device 112 may function as a headset of the first device 110 through which the first user 108 interacts during the communication session. In these and other embodiments, in response to the coupling between the first device 110 and the second device 112 over the second network 114 breaking or not being established, the first device 110 may audible broadcast the remote audio and capture the spoken words of the first user 108 to direct to the remote device 104.

In some embodiments, the first device 110 and the second device 112 may also be communicatively coupled over the third network 116. Over the third network 116, the first device 110 and the second device 112 may be configured to share indications of associations with the transcription system 120. For example, the first device 110 may indicate to the second device 112 whether the first device 110 is associated with the transcription system 120 and the second device 112 may indicate to the first device 110 whether the second device 112 is associated with the transcription system 120.

In some embodiments, in response to one of the first device 110 and the second device 112 not being associated with the transcription system 120, the one of the first device 110 and the second device 112 associated with the transcription system 120 may direct the remote audio to the transcription system 120 and obtain a transcription of the remote audio from the transcription system 120.

In some embodiments, in response to both of the first device 110 and the second device 112 being associated with the transcription system 120, but one or both of the first device 110 and the second device 112 not providing an indication of the association to the other of the first device 110 and the second device 112, both of the first device 110 and the second device 112 may direct the remote audio to the transcription system 120. In these and other embodiments, the transcription system 120 may handle the request from each of the first device 110 and the second device 112 separately. Thus, the transcription system 120 may generate a first transcription for the remote audio from the first device 110 and send the first transcription to the first device 110. Alternately or additionally, the transcription system 120 may generate a second transcription of the remote audio from the second device 112 and send the second transcription to the second device 112.

In some embodiments, in response to both of the first device 110 and the second device 112 being associated with the transcription system 120 and both of the first device 110 and the second device 112 providing an indication of the association to the other of the first device 110 and the second device 112, the first device 110 and the second device 112 may follow a transcription system protocol. Following the transcription system protocol may allow the first device 110 and the second device 112 to determine which of the first device 110 and the second device 112 may direct the remote audio to the transcription system 120 and obtain the transcription of the remote audio from the transcription system 120.

In some embodiments, the transcription system protocol may determine which of the first device 110 and the second device 112 may interact with the transcription system 120 based on information available to both the first device 110 and the second device 112. In these and other embodiments, each of the first device 110 and the second device 112 may include the transcription system protocol. Based on the information available to both the first device 110 and the second device 112, each of the first device 110 and the second device 112 may determine whether to interact with the transcription system 120.

For example, in some embodiments, the transcription system protocol may determine which of the first device 110 and the second device 112 may interact with the transcription system 120 based on information from an audio sharing protocol used by the first device 110 and the second device 112 when sharing the remote audio therebetween over the second network 114. For example, the transcription system protocol may use which of the first device 110 and the second device 112 is performing or not performing one of multiple procedures in the audio sharing protocol. As an example, the multiple procedures in the audio sharing protocol may include which of the first device 110 and the second device 112 audibly broadcasts the remote audio to the first user 108, captures spoken words from the first user 108, or obtains input from the user to adjust or end the communication session, among other actions associated with the communication session.

For example, in response to the first device 110 audibly broadcasting the remote audio to the first user 108 based on the audio sharing protocol, the transcription system protocol may designate the first device 110 to interact with the transcription system 120. As another example, in response to the second device 112 not being selected to capture spoken words from the first user 108, the transcription system protocol may designate the second device 112 to interact with the transcription system 120.

As another example, the transcription system protocol may determine which of the first device 110 and the second device 112 may interact with the transcription system 120 based on information shared between the first device 110 and the second device 112 regarding the network connections between the first device 110 and the second device 112. For example, the one of the first device 110 and the second device 112 with the faster, less expensive, more secure, or less trafficked network connection, or some combination thereof may be selected to interact with the transcription system 120.

As another example, the transcription system protocol may determine which of the first device 110 and the second device 112 may interact with the transcription system 120 based on information regarding the first device 110 and second device 112, such as processing availability, processing ability, or user interactions with the first device 110 and second device 112, among other criteria regarding the first device 110 and second device 112. For example, the other criteria may include one of the first device 110 and the second device 112 includes an internal ASR system. In these and other embodiments, the transcription system protocol may determine that neither of the first device 110 and the second device 112 may interact with the transcription system 120 based on the one of the first device 110 and the second device 112 including the internal ASR system.

As another example, the transcription system protocol may determine which of the first device 110 and the second device 112 may interact with the transcription system 120 based on information including a type of service that each of the first device 110 and the second device 112 may receive from the transcription system 120. For example, the first device 110 may be registered to receive a first level of service from the transcription system 120 and the second device 112 may be registered to receive a second level of service from the transcription system 120. The transcription system protocol may select one of the first device 110 and the second device 112 based on the service levels associated with each of the first device 110 and the second device 112. In these and other embodiments, the service levels offered by the transcription system 120 may vary based on processes used to generate the transcription. For example, a first level of service may use a machine-based transcription process. A second level of service may use a revoicing transcription process. A third level of service may use a combinational process that employs a combination of a machine-based transcription process and revoicing transcription process. Alternately or additionally, the information may include a cost associated with each of the levels of service.

Modifications, additions, or omissions may be made to the environment 100 without departing from the scope of the present disclosure. For example, in some embodiments, the environment 100 may include not include the third network 116. In these and other embodiments, the first device 110 and the second device 112 may share indications of associations with the transcription system 120 using the second network 114. Alternately or additionally, the first device 110 and the second device 112 may share indications of associations with the transcription system 120 using the first network 102 or using some other method.

As another example, the first device 110 and the second device 112 may be configured to share additional information over the second network 114 or the third network 116. For example, over the third network 116, the first device 110 and the second device 112 may share transcriptions obtained from the remote transcription system. As such, both the first device 110 and the second device 112 may obtain the transcriptions. In these and other embodiments, the transcriptions may be transcriptions of a current communication session or previous communication sessions. Alternately or additionally, additional information may be shared between the first device 110 and the second device 112. For example, the first device 110 may provide information regarding communication sessions, such as communication session identifiers, such as caller ID, and contact information, among other information.

Figure 2A:
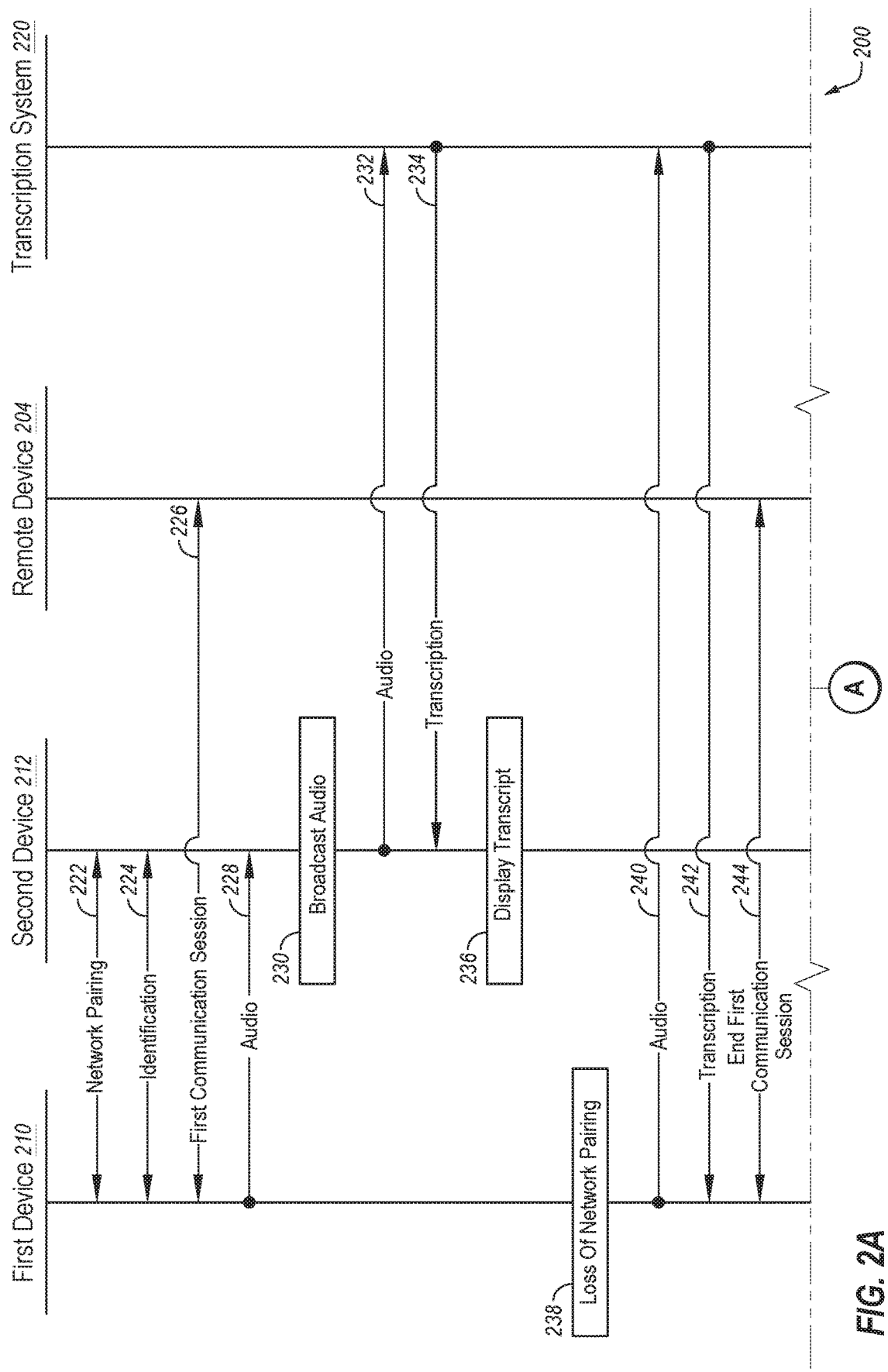
FIGS. 2A-2C illustrate example operations related to transcription of communications.
Figure 2B:
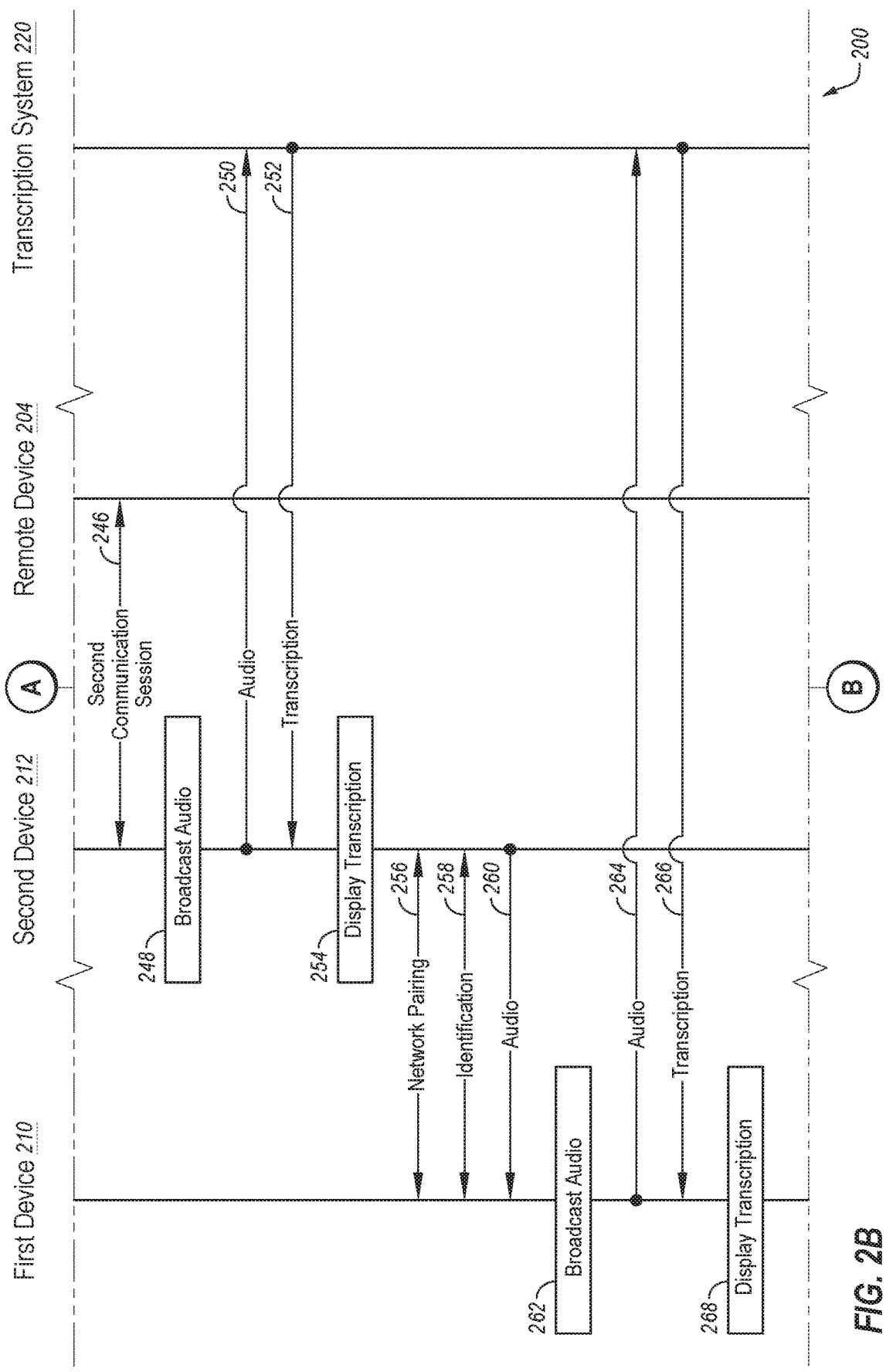
Figure 2C:
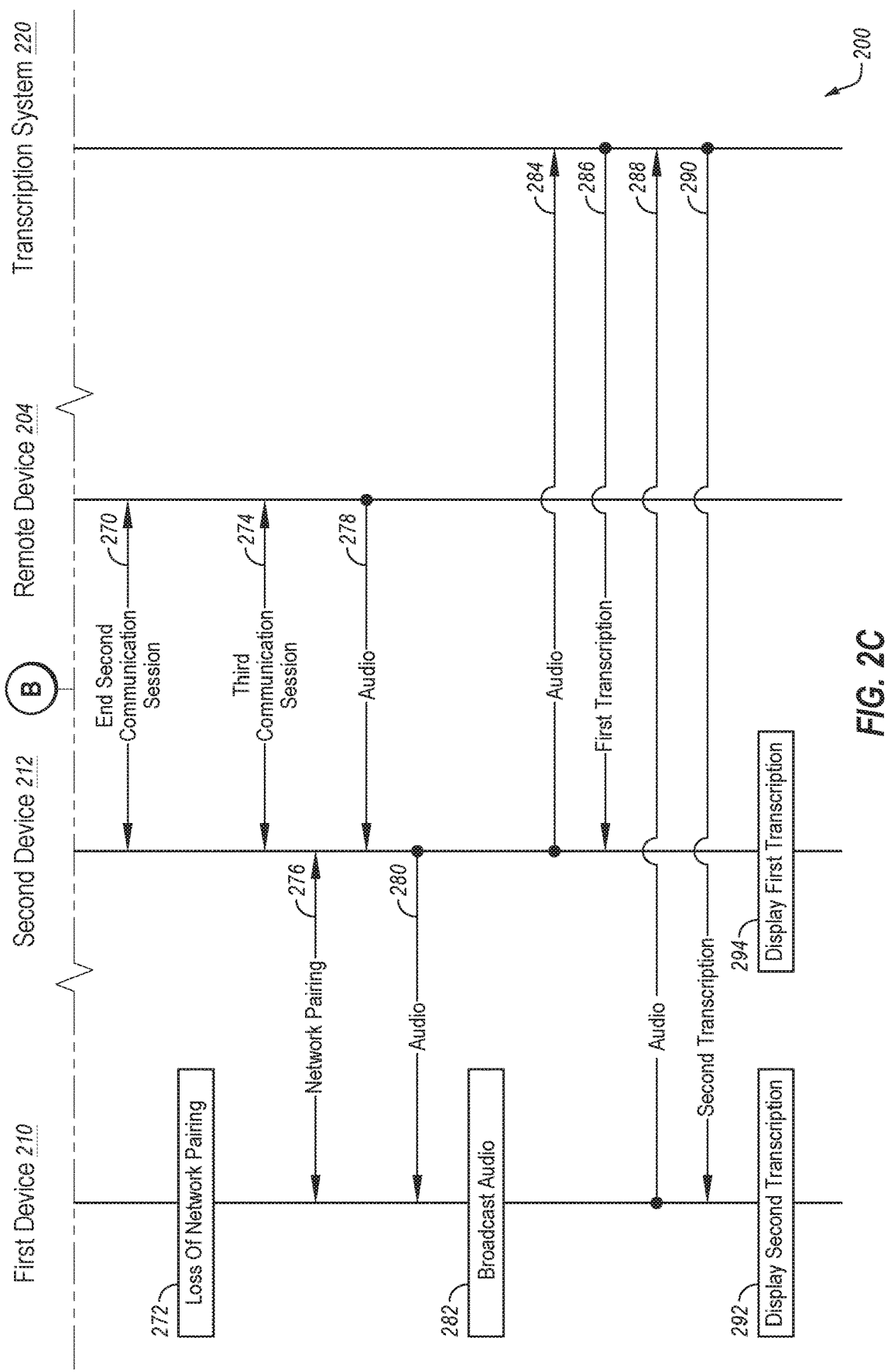

FIGS. 2A-2C illustrate example operations 200 related to transcription of communications. The operations 200 may be arranged in accordance with at least one embodiment described in the present disclosure. In the illustrated example, the operations 200 may be between a remote device 204, a first device 210, a second device 212, and a transcription system 220. In some embodiments, the remote device 204, the first device 210, the second device 212, and the transcription system 220 may be analogous to the remote device 104, the first device 110, the second device 112, and the transcription system 120, respectively, of FIG. 1. Accordingly, no further explanation is provided with respect thereto. Alternatively or additionally, the operations 200 may be an example of the operation of the elements of the environment of FIG. 1.

In some embodiments, the operations 200 may be an example of communications and interactions between the remote device 204, the first device 210, the second device 212, and the transcription system 220. In some embodiments, the interactions between the remote device 204, the first device 210, the second device 212, and the transcription system 220 may occur over a first network (e.g., the first network 102 of FIG. 1), over a second network (e.g., the second network 114 of FIG. 1), and/or a third network (e.g. the third network 116 of FIG. 1). Generally, the operations 200 may relate to managing obtaining transcription of communications between the first device 210 and the second device 212. The operations 200 illustrated are not exhaustive but are merely representative of operations 200 that may occur. Furthermore, one operation as illustrated may represent one or more communications, operations, and/or data exchanges.

At operation 222, the first device 210 and the second device 212 may be paired over a first wireless network. The pairing of the first device 210 and the second device 212 may include communicatively coupling the first device 210 and the second device 212. In these and other embodiments, the pairing of the first device 210 and the second device 212 may allow the first device 210 and the second device 212 to share audio therebetween. For example, when the first device 210 is configured to broadcast audio, the first device 210 may send the audio to the second device 212 or vice versa.

In some embodiments, the first device 210 and the second device 212 may be paired in response to the first device 210 and the second device 212 being within a range of the first wireless network. In these and other embodiments, the first wireless network may by a Bluetooth® network. In these and other embodiments, when the first device 210 and the second device 212 are within a particular range of each other the first device 210 and the second device 212 may be paired over the first wireless network. In these and other embodiments, the first device 210 may be mobile device such as a mobile phone and the second device 212 may be a stationary device such as a desktop console phone.

At operation 224, the first device 210 and the second device 212 may share identification therebetween in response to the pairing at operation 222. The sharing of the identification may allow the first device 210 and the second device 212 to determine that the other of the first device 210 and the second device 212 are associated with the transcription system 220. In these and other embodiments, sharing identification therebetween may be performed using the first wireless network. Alternately or additionally, sharing identification therebetween may be performed using a second wireless network that is different than the first wireless network. In these and other embodiments, the second wireless network may be a Bluetooth® low energy network.

At operation 226, a first communication session may be established between the first device 210 and the remote device 204. The first communication session may be established after the operations 222 and 224. During the first communication session, audio obtained by the first device 210 may be directed to the remote device 204. Alternately or additionally, remote audio obtained by the remote device 204 may be directed to the first device 210. The first communication session may be established over a network that is different from the first and second wireless networks.

At operation 228, the first device 210 may direct the remote audio, from the communication session with the remote device 204, to the second device 212. The first device 210 may direct the remote audio to the second device 212 using the first wireless network based on the communication protocol established during the network pairing of the operation 222.

At operation 230, the second device 212 may be configured to audibly broadcast the remote audio of the communication session between the first device 210 and the remote device 204.

At operation 232, the second device 212 may be configured to direct the remote audio to the transcription system 220. The second device 212 may direct the remote audio to the transcription system 220 based on a transcription system protocol included in the second device 212. In these and other embodiments, the second device 212 may be elected to send the remote audio to the transcription system 220 based on the second device 212 being associated with the transcription system 220 and the second device 212 obtaining an indication that the first device 210 is also associated with the transcription system 220 during the operation 224. In these and other embodiments, the transcription system protocol may select the second device 212 based on the second device 212 being configured to audibly broadcast the remote audio. In these and other embodiments, the first device 210 may not direct the remote audio to the transcription system 220 based on the first device 210 being associated with the transcription system 220, the first device 210 obtaining an indication from the second device 212 that the second device 212 is associated with the transcription system 220, and the transcription system protocol. To direct the remote audio to the transcription system 220, the second device 212 may establish a network connection with the transcription system 220 using networking protocols, passwords, or other procedures to establish the network connection. After establishing a network connection, a first transcription session may be established by the transcription system 220 to generate a transcription of the remote audio. The first transcription session may be between the second device 212 and the transcription system 220 and not associated with the first device 210.

At operation 234, the transcription system 220 may direct a transcription of the remote audio generated by the first transcription session to the second device 212.

At operation 236, the second device 212 may be configured to display the transcription. The second device 212 may be configured to display the transcription in substantially real-time or real-time in configuration with audibly broadcasting the remote audio in operation 230.

At operation 238, the network pairing between the first device 210 and the second device 212 may be lost. For example, the network pairing between the first device 210 and the second device 212 may be lost based on the first device 210 moving out of range of the first wireless network. Alternately or additionally, the network pairing between the first device 210 and the second device 212 may be lost based on any other cause. The loss of the network pairing between the first device 210 and the second device 212 may not result in the termination of the first communication session. As such, the first device 210 may continue to receive the remote audio from the remote device 204. In these and other embodiments, based on the loss of the network pairing, the first device 210 may begin audible broadcasting the remote audio and stop sharing the remote audio with the second device 212. As a result of the second device 212 not obtaining the remote audio from the first device 210, the second device 212 may end the first transcription session between the second device 212 and the transcription system 220.

At operation 240, the first device 210 may be configured to direct the remote audio to the transcription system 220. The first device 210 may direct the remote audio to the transcription system 220 based on the transcription system protocol. For example, the transcription system protocol may dictate that in response to the remote audio not being shared between the first device 210 and the second device 212, the device that obtains the remote audio may direct the remote audio to the transcription system 220. To direct the remote audio to the transcription system 220, the first device 210 may establish a network connection with the transcription system 220. In these and other embodiments, the network connection between the first device 210 and the transcription system 220 may be different than the network connection between the second device 212 and the transcription system 220. In these and other embodiments, the transcription system 220 may establish a second transcription session separate from the first transcription system based on the remote audio obtained from the first device 210. The transcription system 220 may establish the second transcription session even though the remote audio results from the first communication session, where the first communication session also resulted in the remote audio for the first transcription session between the second device 212 and the transcription system 220.

At operation 242, the transcription system 220 may direct a transcription of the remote audio generated by the second transcription session to the first device 210.

At operation 244, the first communication session between the remote device 204 and the first device 210 may end. As a result of the end of the first communication session, the first device 210 may end the second transcription session between the first device 210 and the transcription system 220.

At operation 246, a second communication session may be established between the second device 212 and the remote device 204. The second communication session may be established when the second device 212 and the first device 210 are not paired over the first wireless network or without the second device 212 and the first device 210 receiving an indication of associations with the transcription system 220. During the second communication session, audio obtained by the second device 212 may be directed to the remote device 204. Alternately or additionally, remote audio obtained by the remote device 204 may be directed to the second device 212.

At operation 250, the second device 212 may be configured to direct the remote audio from the remote device 204 to the transcription system 220. Before directing the remote audio to the transcription system 220, the second device 212 may establish a network connection with the transcription system 220 and the transcription system 220 may establish a third transcription session to transcribe the remote audio from the second communication session.

At operation 252, the transcription system 220 may direct a transcription of the remote audio generated by the third transcription session to the second device 212.

At operation 254, the second device 212 may be configured to display the transcription. The second device 212 may be configured to display the transcription in substantially real-time or real-time in conjunction with audibly broadcasting the remote audio in operation 248.

At operation 256, after the second device 212 has audibly broadcast the remote audio at operation 248 and displayed the transcription at operation 254, the first device 210 and the second device 212 may be paired over the first wireless network to allow the first device 210 and the second device 212 to share audio therebetween. In these and other embodiments, the first device 210 and the second device 212 may be paired in response to the first device 210 and the second device 212 both being within a range of the first wireless network.

At operation 258, the first device 210 and the second device 212 may share identification therebetween in response to the pairing at operation 256. The sharing of the identification may allow the first device 210 and the second device 212 to determine that the other of the first device 210 and the second device 212 is associated with the transcription system 220.

At operation 260, in response to the pairing of the first device 210 and the second device 212, the second device 212 may direct the remote audio of the second communication session to the first device 210.

At operation 262, the first device 210 may be configured to audible broadcast the remote audio from the second communication session.

At operation 264, the first device 210 may be configured to direct the remote audio from the second communication session to the transcription system 220. The first device 210 may direct the remote audio to the transcription system 220 based on a transcription system protocol included in the first device 210. In these and other embodiments, the first device 210 may be selected to send the remote audio to the transcription system 220 based on the first device 210 being associated with the transcription system 220 and the first device 210 obtaining an indication that the second device 212 is also associated with the transcription system 220 during the operation 258. In these and other embodiments, the transcription system protocol may select the first device 210 based on the first device 210 being configured to audibly broadcast the remote audio.

In these and other embodiments, the second device 212 may not direct the remote audio to the transcription system 220 based on the transcription system protocol. As a result, the second device 212 may stop directing the remote audio to the transcription system 220 and the transcription system 220 may end the third transcription session. To direct the remote audio to the transcription system 220, the first device 210 may establish a network connection with the transcription system 220. After establishing a network connection, a fourth transcription session may be established by the transcription system 220 to generate a transcription of the remote audio. The fourth transcription session may be between the first device 210 and the transcription system 220 and not associated with the second device 212.

At operation 266, the transcription system 220 may direct a transcription of the remote audio generated by the fourth transcription session to the first device 210.

At operation 268, the first device 210 may be configured to display the transcription. The first device 210 may be configured to display the transcription in substantially real-time or real-time in conjunction with audibly broadcasting the remote audio in operation 262.

At operation 270, the second communication session between the remote device 204 and the second device 212 may end. As a result of the end of the second communication session, the first device 210 may end the fourth transcription session between the first device 210 and the transcription system 220.

At operation 272, the network pairing between the first device 210 and the second device 212 may be lost. At operation 274, a third communication session may be established between the second device 212 and the remote device 204. The third communication session may be established when the second device 212 and the first device 210 are not paired over the first wireless network or received an indication of associations with the transcription system 220. During the third communication session, audio obtained by the second device 212 may be directed to the remote device 204. Alternately or additionally, remote audio obtained by the remote device 204 may be directed to the second device 212.

At operation 276, after the second device 212 has audibly broadcast the remote audio from the third communications session, the first device 210 and the second device 212 may be paired over the first wireless network to allow the first device 210 and the second device 212 to share audio therebetween.

At operation 278, the second device 212 may be configured to obtain remote audio during the third communication session. At operation 280, the second device 212 may be configured to provide the remote audio to the first device 210 based on the network pairing of the first device 210 and the second device 212.

At operation 282, the first device 210 may be configured to audible broadcast the remote audio from the third communication session.

At operation 284, the second device 212 may be configured to direct the remote audio from the third communication session to the transcription system 220. The second device 212 may direct the remote audio to the transcription system 220 based on a transcription system protocol included in the second device 212. In these and other embodiments, the second device 212 may be selected to send the remote audio to the transcription system 220 based on the second device 212 being associated with the transcription system 220 and the second device 212 not obtaining an indication that the first device 210 is also associated with the transcription system 220 after the network pairing in operation 276.

In these and other embodiments, to direct the remote audio to the transcription system 220, the second device 212 may establish a network connection with the transcription system 220. After establishing a network connection, a fifth transcription session may be established by the transcription system 220 to generate a transcription of the remote audio. The fifth transcription session may be between the second device 212 and the transcription system 220 and not associated with the first device 210. At operation 286, the transcription system 220 may direct a transcription of the remote audio generated by the fifth transcription session to the second device 212.

At operation 288, the first device 210 may be configured to direct the remote audio from the third communication session to the transcription system 220. The first device 210 may direct the remote audio to the transcription system 220 based on a transcription system protocol included in the first device 210. In these and other embodiments, the first device 210 may be selected to send the remote audio to the transcription system 220 based on the first device 210 being associated with the transcription system 220 and the first device 210 not obtaining an indication that the second device 212 is also associated with the transcription system 220 after the network pairing in operation 276.

In these and other embodiments, to direct the remote audio to the transcription system 220, the first device 210 may establish a network connection with the transcription system 220. After establishing a network connection, a sixth transcription session may be established by the transcription system 220 to generate a transcription of the remote audio. The sixth transcription session may be between the first device 210 and the transcription system 220 and not associated with the second device 212. At operation 266, the transcription system 220 may direct a transcription of the remote audio generated by the sixth transcription session to the first device 210. In these and other embodiments, the fifth transcription session and the sixth transcription session may occur in substantially overlapping time periods.

At operation 292, the first device 210 may be configured to display the transcription. The first device 210 may be configured to display the transcription in substantially real-time or real-time in configuration with audibly broadcasting the remote audio in operation 282.

At operation 294, the second device 212 may be configured to display the transcription. The second device 212 may be configured to display the transcription in substantially real-time or real-time in configuration with audibly broadcasting of the remote audio by the first device 210. In these and other embodiments, the first transcription and the second transcription may be similar or the same because the remote audio provided to the transcription system 220 for generating the first and second transcriptions may be the same.

Modifications, additions, or omissions may be made to the operations 200 without departing from the scope of the present disclosure. For example, the operations 200 may not include the operations regarding the second and third communication sessions in some embodiments. As another example, in some embodiments, the operations 200 may be arranged in a different order or performed at the same time. For example, the operations 284, 286, and 294 may occur before the operation 276. Alternately or additionally, the operations 282, 284, 286, 288, 290, 292, and 294 may occur at the same time or in substantially overlapping time periods during the third communication session and may be performed in an ongoing basis during the third communication session. Alternately or additionally, the operations 260, 262, 264, 266, and 268 may occur at the same time or in substantially overlapping time periods during the second communication session and may be performed in an ongoing basis during the second communication session. Alternately or additionally, the operations 230, 232, 234, and 236 may occur at the same time or in substantially overlapping time periods during the first communication session and may be performed in an ongoing basis during the first communication session.

As another example, the operations that occur with respect to the first communication session, the second communication session, and the third communication session may occur in any order. For example, the operations for the second communication session may occur without any operations occurring with respect to the first communication session. The sequential nature of the first communication session, the second communication session, and the third communication is provided as a means of explanation and does not imply any ordering of the operations associated with each communication session. As such, the operations associated with each of the communication sessions may occur independent and distinct from the operations associated with each of the other communication sessions.

Figure 3:
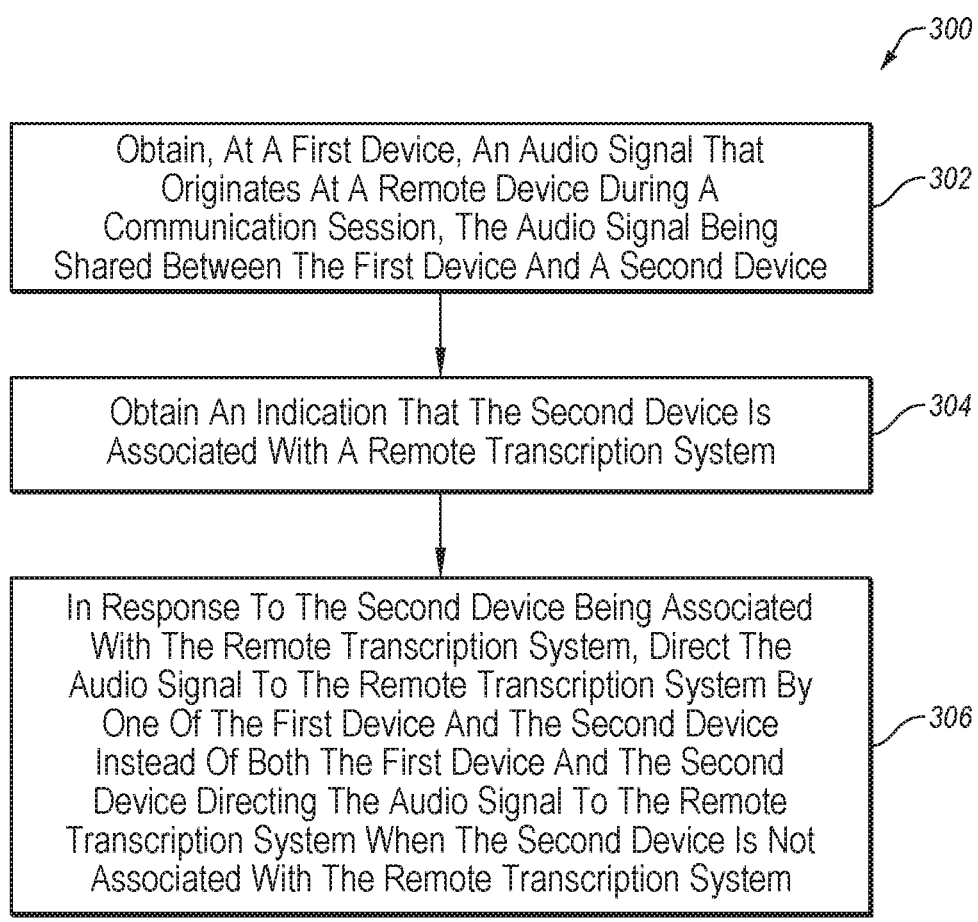
FIG. 3 illustrates a flowchart of an example method to transcribe communications.

FIG. 3 illustrates a flowchart of an example method 300 to transcribe communications. The method 300 may be arranged in accordance with at least one embodiment described in the present disclosure. One or more operations of the method 300 may be performed, in some embodiments, by a device or system, such as the first device 110 or the second device 112 of FIG. 1 or the system 400 of FIG. 4 or another device, combination of devices, or system. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 302, where an audio signal may be obtained at a first device that originates at a remote device during a communication session. The audio signal may be shared between the first device and a second device. In some embodiments, the audio signal may be shared between the first device and the second device over a first short-range wireless network. In some embodiments, the audio signal may be obtained at the first device from the second device.

At block 304, an indication that the second device is associated with a remote transcription system may be obtained. In some embodiments, the indication may be obtained by the first device. In some embodiments, the indication that the second device is associated with the remote transcription system may be obtained via a second short-range wireless network. Alternately or additionally, the indication that the second device is associated with the remote transcription system may be obtained before the audio signal is obtained.

At block 306, in response to the second device being associated with the remote transcription system, the audio signal may be directed to the remote transcription system by one of the first device and the second device instead of both the first device and the second device directing the audio signal to the remote transcription system when the second device is not associated with the remote transcription system. In some embodiments, the one of the first device and the second device selected to direct the audio signal to the remote transcription system may be based on which of the first device and the second device audibly broadcasts the audio signal during the communication session.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 300 may further include directing the audio signal to the second device to share the audio signal between the first device and the second device when the audio signal is obtained at the first device from the remote device. As another example, the method 300 may further include obtaining a transcription of the audio signal from the remote transcription system during the communication session. In these and other embodiments, the method 300 may further include directing the transcription to the second device.

Figure 4:
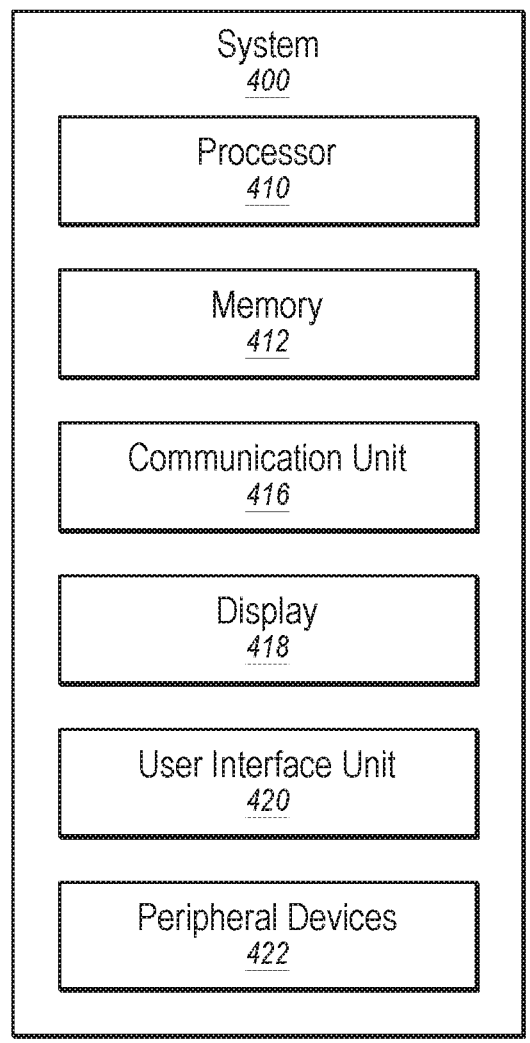
FIG. 4 illustrates an example system that may be used during transcription of communications.

FIG. 4 illustrates an example system 400 that may be used during transcription of communications. The system 400 may be arranged in accordance with at least one embodiment described in the present disclosure. The system 400 may include a processor 410, memory 412, a communication unit 416, a display 418, a user interface unit 420, and a peripheral device 422, which all may be communicatively coupled. In some embodiments, the system 400 may be part of any of the systems or devices described in this disclosure.

For example, the system 400 may be part of the remote device 104 of FIG. 1 and may be configured to perform one or more of the tasks described above with respect to the remote device 104. As another example, the system 400 may be part of the first device 110 or the second device 112 of FIG. 1 and may be configured to perform one or more of the tasks described above with respect to the first device 110 or the second device 112. As another example, the system 400 may be part of the transcription system 120 of FIG. 1 and may be configured to perform one or more of the tasks described above with respect to the transcription system 120.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of networks or physical locations that are configured to perform individually or collectively any number of operations described herein. In some embodiments, the processor 410 may interpret and/or execute program instructions and/or process data stored in the memory 412. In some embodiments, the processor 410 may execute the program instructions stored in the memory 412.

For example, in some embodiments, the processor 410 may execute program instructions stored in the memory 412 that are related to transcription of communications such that the system 400 may perform or direct the performance of the operations associated therewith as directed by the instructions. In these and other embodiments, the instructions may be used to perform one or more operations of the FIG. 2 or the method 300 of FIG. 3.

The memory 412 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 410.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 410 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of *In re Nuuten,* 500 F.3d 1346 (Fed. Cir. 2007). Combinations of the above may also be included within the scope of computer-readable media.

The communication unit 416 may include any component, device, system, or combination thereof that is configured to transmit or receive information over a network. In some embodiments, the communication unit 416 may communicate with other devices at other locations, the same location, or even other components within the same system. For example, the communication unit 416 may include a modem, a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like. The communication unit 416 may permit data to be exchanged with a network and/or any other devices or systems described in the present disclosure. For example, when the system 400 is included in the first device 110 of FIG. 1, the communication unit 416 may allow the first device 110 to communicate with the transcription system 120.

The display 418 may be configured as one or more displays, like an LCD, LED, Braille terminal, or other type of display. The display 418 may be configured to present video, text captions, user interfaces, and other data as directed by the processor 410. For example, when the system 400 is included in the first device 110 of FIG. 1, the display 418 may be configured to present a transcription of second audio from the remote device 104.

The user interface unit 420 may include any device to allow a user to interface with the system 400. For example, the user interface unit 420 may include a mouse, a track pad, a keyboard, buttons, camera, and/or a touchscreen, among other devices. The user interface unit 420 may receive input from a user and provide the input to the processor 410. In some embodiments, the user interface unit 420 and the display 418 may be combined.

The peripheral devices 422 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may broadcast audio received by the system 400 or otherwise generated by the system 400.

Modifications, additions, or omissions may be made to the system 400 without departing from the scope of the present disclosure. For example, in some embodiments, the system 400 may include any number of other components that may not be explicitly illustrated or described. Further, depending on certain implementations, the system 400 may not include one or more of the components illustrated and described.

As indicated above, the embodiments described herein may include the use of a special purpose or general-purpose computer (e.g., the processor 410 of FIG. 4) including various computer hardware or software modules, as discussed in greater detail below. Further, as indicated above, embodiments described herein may be implemented using computer-readable media (e.g., the memory 412 of FIG. 4)

for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method to transcribe communications, the method comprising:
    obtaining, at a first device, an audio signal that originates at a remote device during a communication session, the audio signal being shared between the first device and a second device;
    obtaining, at the first device, an indication that the second device is associated with a remote transcription system; and
    in response to both the second device and the first device being associated with the remote transcription system by being configured to direct audio to the remote transcription system, selecting, based on information shared between the first device and the second device, one of the first device and the second device to direct the audio signal to the remote transcription system instead of both the first device and the second device separately and independently directing the audio signal to the remote transcription system when the second device is not associated with the remote transcription system such that the remote transcription system obtains the audio signal twice.

2. The method of claim 1, wherein the audio signal is shared between the first device and the second device over a short-range wireless network.

3. The method of claim 2, wherein the indication that the second device is associated with the remote transcription system is obtained at the first device via a second short-range wireless network.

4. The method of claim 1, wherein the indication that the second device is associated with the remote transcription system is obtained before the audio signal is obtained.

5. The method of claim 1, wherein the audio signal is obtained at the first device from the second device.

6. The method of claim 1, wherein the audio signal is obtained at the first device from the remote device, the method further comprising directing the audio signal to the second device to share the audio signal between the first device and the second device.

7. The method of claim 1, wherein the one of the first device and the second device is selected to direct the audio signal to the remote transcription system based on which of the first device and the second device audibly broadcasts the audio signal during the communication session.

8. The method of claim 1, further comprising obtaining a transcription of the audio signal from the remote transcription system during the communication session.

9. The method of claim 8, further comprising directing the transcription to the second device.

10. At least one non-transitory computer-readable media configured to store one or more instructions that in response to being executed by at least one computing system cause performance of the method of claim 1.

11. A device comprising:
one or more processors; and
one or more non-transitory computer-readable mediums configured to store instructions that when executed by the processors cause or direct the device to perform operations, the operations comprising:
obtain an audio signal that originates at a remote device during a communication session, wherein the audio signal is shared between the device and a second device;
obtain an indication that the second device is associated with a remote transcription system; and
in response to both the second device and the device being associated with the remote transcription system by being configured to direct audio to the remote transcription system, select, based on information shared between the device and the second device, the device to direct the audio signal to the remote transcription system instead of both the device and the second device separately and independently directing the audio signal to the remote transcription system when the second device is not associated with the remote transcription system such that the remote transcription system obtains the audio signal twice.

12. The device of claim 11, wherein the audio signal is shared between the device and the second device over a short-range wireless network.

13. The device of claim 12, wherein the indication that the second device is associated with the remote transcription system is obtained at the device via a second short-range wireless network.

14. The device of claim 11, wherein the indication that the second device is associated with the remote transcription system is obtained before the audio signal is obtained by the device.

15. The device of claim 11, wherein the audio signal is obtained at the device from the second device.

16. The device of claim 11, wherein the audio signal is obtained at the device from the remote device, wherein the operations further comprise direct the audio signal to the second device to share the audio signal between the device and the second device.

17. The device of claim 11, wherein the indication that the second device is associated with the remote transcription system is obtained at the device via a short-range wireless network.

18. The device of claim 11, wherein the operations further comprise obtain a transcription of the audio signal from the remote transcription system during the communication session.

19. The device of claim 18, wherein the operations further comprise direct the transcription to the second device.

20. The device of claim 18, further comprising a display configured to present the transcription during the communication session.

* * * * *